United States Patent Office 2,972,560
Patented Feb. 21, 1961

2,972,560
METHOD OF MANUFACTURING PAPER

Elmer K. Stilbert, Marion W. Zembal, and Lloyd H. Silvernail, Midland, Mich., assignors to The Dow Chemical Company, Midland, Mich., a corporation of Delaware No Drawing. Filed Apr. 13, 1955, Ser. No. 501,198

4 Claims. (Cl. 162—168)

This invention relates to the manufacture of paper and is particularly directed to an improved method of increasing the retention of fillers in paper.

In the manufacture of many types of paper, mineral fillers are incorporated with the pulp to improve such properties as color, opacity and printability. In general, a large proportion of the fillers normally added to the pulp passes through the paper-making screens. One widely used procedure for increasing the deposition of fillers involves the use of alum as a flocculating agent. However, even with alum considerable amounts of filler are lost into the "white water" which drains from the paper web on the screen. This not only represents a loss of raw material but also results in a waste disposal problem.

A flow sheet of our process may be represented as follows:

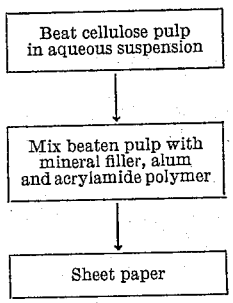

It is an object of the present invention to provide an improved method for the manufacture of paper. An additional object is to provide a method for increasing filler retention in paper. It is a further object to provide a method for reducing the loss of filler materials in the white water waste from paper-making. Still another object is to provide a method for the manufacture of paper, in connection with which a white water is obtained from which suspended solids are readily separated. Other objects will become apparent from the following specification and claims.

According to the present invention, it has been discovered that the incorporation of small amounts of a high molecular weight acrylamide polymer in mixtures of pulp, filler and alum results in marked improvement in the retention of the filler by the paper formed from such mixtures. It is among the advantages of the invention that the suspended solids in the white water, obtained in the formation of paper in accordance with the present invention, settle rapidly so that clarified water may be readily separated therefrom.

The acrylamide polymers effective in the present invention are water-soluble and have a low degree of cross-linking between polymer chains. In a preferred embodiment, the acrylamide polymers are characterized by a viscosity of at least about 3 centipoises for a 0.5 percent by weight solution thereof in distilled water adjusted to a pH of 3 to 3.5 and a temperature of 25° C., as determined with an Ostwald viscosimeter. Wherever the term "viscosity" is hereinafter used, it refers to the viscosity of an aqueous 0.5 percent solution in accordance with the above description. The term "acrylamide polymer," as employed in the present specification and claims, is inclusive of the homopolymer of acrylamide and also copolymers of acrylamide with up to about 15 percent by weight of other suitable monomers such as acrylic and methacrylic acid and their alkyl esters, methacrylamide, styrene, vinyl acetate, acrylonitrile, methacrylonitrile, vinyl alkyl ethers, vinyl and vinylidene chloride and the like, each such polymer being characterized by water solubility and viscosity properties as described above.

Water-soluble acrylamide polymers are sometimes characterized by a greater or less degree of hydrolysis, i.e. contain some free carboxyl groups. This condition is dependent upon the method of manufacture of the polymer, the presence or absence of small amounts of acrylic acid in the starting monomer and conditions of storage of the polymer. The polymer products appear to be equivalent whether the carboxyls result from copolymerization of acrylamide with acrylic acid or from hydrolysis of amide groups subsequent to polymerization. In the practice of the present invention, the operable acrylamide polymers encompass those having not more than about 15 percent of the amide groups replaced by carboxyl groups, as set forth in the above definition of operable polyacrylamide products. The percentage of amide groups replaced by carboxyl groups in an acrylamide polymer is referred to hereinafter as the "percent hydrolysis."

In carrying out the invention the acrylamide polymer is dissolved in water and added to the beaten paper pulp in any suitable fashion. In any case, the acrylamide polymer solution is intimately incorporated with the mixture of pulp, filler and alum before such mixture is employed for the formation of paper. Usually a dilute aqueous solution of the acrylamide polymer is employed in order to facilitate the rapid distribution of the polymer through the pulp suspension and, in general, a solution containing from about 0.02 to about 1.0 percent by weight of the polymer is employed. In such operations, it is preferred to add the acrylamide polymer a short time after the mixing of the filler with the pulp and thereafter to add alum to the mixture.

In a preferred mode of operation, the pulp and filler are mixed together and an aqueous solution of acrylamide polymer is added thereto portionwise with stirring. When operating in such manner, the alum may be introduced into the mixture either concurrently with or preferably following the addition of the acrylamide polymer.

The amount of acrylamide polymer employed will vary depending upon such factors as the type and previous history of the stock, the stock freeness and the particular filler being used. Good results have been obtained when employing from about 0.01 to 3.0 percent by weight of acrylamide polymer based on the weight of fiber in the pulp.

Alum is employed in conventional fashion and amount. In general, from about 2 to about 6 percent by weight of alum based on the weight of fiber in the pulp has proved advantageous depending upon the variable factors as set forth above. Any suitable form of alum may be employed, as for example, potassium aluminum sulfate ($K_2SO_4 \cdot Al_2SO_4 \cdot 24H_2O$). However, in general, it is convenient to employ commercial paper-maker's alum, i.e. aluminum sulfate containing about 17 percent by weight of $Al_2O_3$ equivalent and about 43 percent of water of hydration. In the following examples the word "alum" means paper-maker's alum unless otherwise indicated.

The following examples illustrate the invention but are not to be construed as limiting the same. In the examples, procedures identified by the designation "TAPPI" refer to standard methods published in "Tentative and Official Testing Methods, Recommended Practices, Specifications" by the Technical Association of the Pulp and Paper Industry.

*Example 1*

Commercial bleached Western sulfite pulp was suspended in water at a 2 percent consistency and beaten in a modified Hollander-type beater to a Canadian freeness of 300 milliliters, determined in accordance with TAPPI Standard T 227 m-50. The beaten pulp was diluted to 1 percent consistency and 20 percent by weight of a commercial kaolin filler-clay was added, based on the weight of fiber. The pulp-filler mixture was mechanically agitated for a period of about one minute and divided into portions for subsequent treatment.

To one portion of the mixture, an aqueous 2 percent by weight solution of paper-maker's alum was added with stirring to provide 3 percent by weight of alum based on the weight of fiber. From the resulting mixture hand sheets were formed using the British sheet machine as described in TAPPI Standard T 205 m-53, with no recycle of white water. The hand sheets were dried to constant weight in an oven at 220° F. and analyzed for ash content, using the method set forth in TAPPI Standard T 211 m-44.

A further portion of the paper-filler mixture was mixed with an aqueous 0.05 percent by weight solution of an acrylamide polymer, having a viscosity of 7.8 centipoises and hydrolysis of 4.5 percent, in an amount to provide 0.01 percent by weight of the polymer based on the weight of fiber in the mixture. The polymer solution was added to the pulp-filler mixture portionwise with stirring. The resulting mixture was stirred for a period of 1 to 2 minutes, 3 percent alum added as above, and hand sheets formed and analyzed for ash as before.

Another portion of the original pulp-filler mixture, without further treatment, was used for forming hand sheets to serve as a control.

Each portion of white water obtained in the formation of the hand sheets was observed after ten minutes to ascertain the extent of clarification by sedimentation. The results are summarized in the following table in which the percent filler retention is the percent by weight of ash based on the weight of clay added to the mixture.

| Acrylamide Polymer, Percent by Weight | Alum, Percent By Weight | Percent Filler Retention | Condition of White Water |
|---|---|---|---|
| -------- | -------- | 50.7 | Milky. |
| -------- | 3 | 67.8 | Clear. |
| 0.01 | 3 | 73.0 | Clear. |

*Example 2*

Further determinations of filler retention were carried out employing the materials and methods of Example 1 with the inclusion of 67 percent by weight of kaolin filler. The results were as follows:

| Basis Weight, Pounds per TAPPI Ream | Acrylamide Polymer, Percent by Weight | Alum, Percent by Weight | Percent Filler Retention | Condition of White Water |
|---|---|---|---|---|
| 50 | -------- | -------- | 31.4 | Milky. |
| 50 | -------- | 3 | 38.3 | Clear. |
| 53 | 0.01 | 3 | 42.3 | Clear. |
| 110 | -------- | -------- | 49.2 | Milky. |
| 126 | -------- | 3 | 59.2 | Clear. |
| 119 | 0.01 | 3 | 63.3 | Clear. |

The basis weight of the hand sheets was determined as set forth in TAPPI Standard T 410 m-45.

*Example 3*

Employing the bleached Western sulfite pulp and general procedure of Example 1, determinations of filler retention were carried out, substituting 50 percent by weight of titanium dioxide for the clay in Example 1. The results are summarized in the following table:

| Acrylamide Polymer, Percent by Weight | Alum, Percent By Weight | Percent Filler Retention | Condition of White Water |
|---|---|---|---|
| -------- | -------- | 35.1 | Milky. |
| -------- | 3 | 54.3 | Clear. |
| 0.01 | 3 | 57.7 | Clear. |

*Example 4*

Well beaten sulfite pulp as in Example 1 was mixed with 20 percent by weight of titanium dioxide based on the weight of fiber. To a portion of the resulting mixture, 4 percent by weight of alum was added with stirring and hand sheets were formed on the British sheet machine with the recycling unit attached to recycle the white water. Eighteen sheets were formed and the last sheet dried and analyzed for ash content as in Example 1.

To a further portion of the pulp-filler mixture, an aqueous 0.05 percent by weight solution of the acrylamide polymer of Example 1 was added to provide 0.01 percent by weight of the polymer based on the weight of fiber in the mixture. Thereafter 4 percent by weight of alum was added and hand sheets formed and analyzed for ash as above.

The results are summarized in the following table wherein the percent filler retention is calculated as in Example 1. Observations of white water clarification were recorded as in the preceding examples.

| Acrylamide Polymer, Percent by Weight | Alum, Percent By Weight | Percent Filler Retention | Condition of White Water |
|---|---|---|---|
| -------- | 4 | 84.2 | Clear. |
| 0.01 | 4 | 90.3 | Clear. |

*Example 5*

Commercial unbleached Southern kraft pulp was suspended in water at a 2 percent consistency and beaten in a modified Hollander-type beater to a Canadian freeness of 600 milliliters. The beaten pulp was diluted to one percent consistency and mixed with 20 percent by weight of a titanium dioxide pigment (Titanox RA 10) based on the weight of fiber. The pulp-filler mixture was mechanically agitated for a period of about one minute and divided into portions for subsequent treatment.

To one portion of the mixture, an aqueous 2 percent by weight solution of paper-maker's alum was added with stirring to provide 6 percent by weight of alum, based on the weight of fiber. The resulting mixture, having a pH of 4.8, was employed for forming hand sheets as in Example 1 and the ash content of the hand sheets was determined.

A further portion of the pulp-filler mixture was mixed with an aqueous 0.05 percent by weight solution of the acrylamide polymer of Example 1 in an amount to provide 0.5 percent by weight of the polymer based on the weight of fiber in the mixture. The resulting mixture was stirred for a period of 1 to 2 minutes, 6 percent alum added as above and hand sheets formed and analyzed for ash content. The pulp mixture after addition of the alum had a pH of 4.8.

The results are summarized in the following table.

wherein the percent filler retention and condition of white water were determined as in Example 1.

| Acrylamide Polymer, Percent by Weight | Alum, Percent By Weight | Percent Filler Retention | Condition of White Water |
|---|---|---|---|
|  | 6 | 52.6 | Clear. |
| 0.5 | 6 | 64.2 | Clear. |

The invention has been illustrated employing commercial wood pulp fibers, however, it should be understood that the method of the invention may be practiced with any of the cellulosic fibers employed in the production of paper and paperboard. Thus, the term "pulp" as employed in the present specification and claims, unless otherwise specifically designated, refers to cellulosic fibers suitable for the manufacture of paper and includes, for example, such fibers derived from cotton and linen rags and tow, straw, esparto grass, sisal, wood, jute, bamboo and the like. Such pulp fibers are employed after conventional preparation steps such as cooking, shredding and beating or refining.

*Example 6*

Acrylamide polymers of various viscosities were dissolved in water to form solutions containing 0.05 percent by weight of polymer. Each such solution was added to a separate portion of a beaten pulp suspension similar to that employed in Example 1 in amount equivalent to 0.5 percent by weight of the polymer based on the weight of fiber in the pulp. Thereafter a titanium dioxide filler was added in the amount of 25 percent by weight, the mixture was agitated for several minutes and 5 percent by weight of alum was added. From the resulting mixture hand sheets were formed and the ash content thereof determined as in Example 1.

A further portion of the pulp was mixed successively with 25 percent by weight of the titanium oxide and 5 percent by weight of alum. From the resulting mixture hand sheets were formed and the ash content thereof determined as above to serve as a control.

The results in terms of percent filler retention are recorded in the following table.

| Viscosity of Acrylamide Polymer | Percent by Weight of Acrylamide Polymer | Percent Filler Retention |
|---|---|---|
|  | None | 60.5 |
| 1.05 | 0.5 | 60.6 |
| 3.4 | 0.5 | 68.7 |
| 7.8 | 0.5 | 82.0 |

*Example 7*

An aqueous one percent by weight solution of an acrylamide polymer having a viscosity of 7.8 centipoises was mixed with portions of the pulp suspension of Example 6 and 25 percent by weight of titanium oxide filler and 5 percent by weight of alum added to the mixture as in Example 6. Sufficient of the acylamide polymer solution was employed to provide treatments of 0.5 and 3.0 percent by weight of the polymer based on the weight of fiber in the pulp. Hand sheets were formed and ash determined as in Example 1. The 0.5 percent treatment gave filler retention of 82.3 percent and the 3.0 percent treatment gave filler retention of 90 percent as compared to 60.5 percent retention for the control treated with alum in the absence of acrylamide polymer.

*Example 8*

A further portion of the beaten pulp suspension of Example 6 containing 100 parts by weight of cellulosic fiber was mixed with 25 parts of titanium dioxide filler and agitated for a period of one minute. To the resulting mixture 5 parts of alum was added in the form of an aqueous 2 percent by weight solution with agitation over a period of 5 minutes and thereafter 5 parts of an acrylamide polymer was added to the mixture. The acrylamide polymer had a viscosity of 7.8 centipoises and was employed in the form of an aqueous 0.05 percent by weight solution. After addition of the polymer the mixture was agitated for 5 minutes and hand sheets formed and analyzed for ash as in Example 1. The filler retention was found to 92.3 percent as compared to retention of about 60 percent for control sheets prepared in the same way except for the ommission of the acrylamide polymer.

We claim:

1. A process for the manufacture of paper which comprises the steps of forming an aqueous mixture of beaten cellulosic pulp, mineral filler and an acrylamide polymer, said polymer being characterized by a viscosity of at least 3.0 centipoises and being employed in the amount of from about 0.01 to about 3.0 percent by weight based on the weight of cellulosic fiber in the pulp, and said polymer being selected from the group consisting of polyacrylamide and hydrolyzed polyacrylamide having not more than 15 percent of the amide groups of the homopolymer replaced by carboxyl groups, adding alum to said mixture and from the resulting mixture forming a paper web, whereby the retention of the filler in the paper web is increased.

2. A method for increasing filler retention in the manufacture of paper which comprises incorporating in an aqueous suspension of beaten cellulosic pulp, a mineral filler, an acrylamide polymer and alum, said polymer being characterized by a viscosity of at least 3.0 centipoises and being employed in the amount of from about 0.01 to about 3 percent by weight based on the weight of cellulosic fiber in the pulp and said polymer being selected from the group consisting of polyacrylamide and hydrolyzed polyacrylamide having not more than 15 percent of the amide groups of the homopolymer replaced by carboxyl groups, and thereafter forming a paper web from the suspension.

3. In a method for the manufacture of paper wherein an aqueous suspension of beaten paper pulp is produced and the latter is mixed with a filler and alum, the improvement which comprises intimately incorporating in the mixture of beaten pulp, filler and alum, an acrylamide polymer, characterized by a viscosity of at least 3.0 centipoises, said step of incorporating acrylamide polymer being carried out after the pulp leaves the heater and before the pulp mixture is employed for the formation of paper, the acrylamide polymer being employed in the amount of from about 0.01 to about 3 percent by weight based on the weight of cellulose fiber in the pulp and said polymer being selected from the group consisting of polyacrylamide and hydrolyzed polyacrylamide having not more than 15 percent of the amide groups of the homopolymer replaced by carboxyl groups.

4. A process according to claim 3 wherein the acrylamide polymer is added to the pulp mixture in the form of a dilute aqueous solution.

References Cited in the file of this patent

UNITED STATES PATENTS

| 2,173,005 | Strain | Sept. 12, 1939 |
| 2,729,560 | House et al. | Jan. 3, 1956 |

FOREIGN PATENTS

| 354,510 | Italy | Nov. 25, 1937 |
| 477,265 | Canada | Sept. 25, 1951 |

OTHER REFERENCES

Casey: "Pulp and Paper," vol. I, Interscience Publishers, Inc., New York, 1952, pages 533, 534, 468 and 469.